United States Patent Office 3,185,561
Patented May 25, 1965

3,185,561
HERBICIDAL COMPOSITION AND METHOD
Donald S. Acker, Waynesboro, Va., assignor to E. I. du Pont de Nemours and Company, Wilmington, Del., a corporation of Delaware
No Drawing. Filed Apr. 9, 1962, Ser. No. 185,849
3 Claims. (Cl. 71—2.5)

This application is a continuation-in-part of my application Serial No. 846,062, filed October 13, 1959, which is a continuation-in-part of my application Serial No. 679,760, filed August 22, 1957, and both now abandoned.

This invention relates to a certain class of novel substituted symmetrical triazines.

This class of triazines is represented by the formula (1)

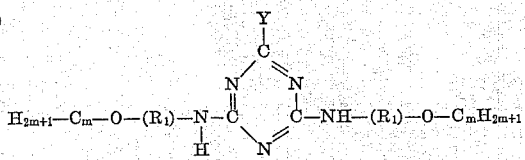

wherein $R_1$ is

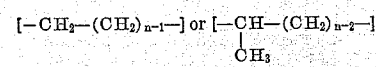

$n$ is a whole positive integer from 3 through 8, preferably 3;
$m$ is a whole positive integer from 1 through 8; and
Y is a member of the group consisting of OR and SR where R is an alkyl group of less than 3 carbon atoms.

It has been found that the substituted symmetrical triazines represented by Formula 1 possess an outstanding type of herbicidal activity. While these compounds are effective as general herbicides, including pre-emergence herbicidal use, by far their most outstanding utility is as postemergence herbicides. When applied as postemergence herbicides to areas already infested with undesirable vegetation, they give outstandingly quick foliar burn and kill of the weed infestation. Furthermore, these compounds are characterized by broad spectrum herbicidal activity; that is, they control a wide variety of weeds including both broadleaf and grass weeds.

These novel substiuted triazines can be prepared by reacting an alkoxyalkylamino substituted symmetrical triazine with a metal alkoxide or mercaptide in an alcohol solvent as described by Equation 2.

(2)

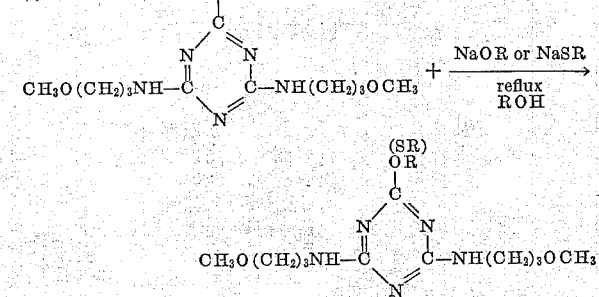

wherein R is the same as defined above.

The novel triazine reactant shown in Equation 2 above and the other 2-chloro-4,6-di(alkoxyalkylamino)-s-triazines used to prepare some compounds of this invention can be prepared conveniently by the reaction of cyanuric chloride with two mol equivalents of 3-methoxypropylamine, 2-amino-1-methoxypropane or similar alkoxyalkyl amines.

It is well known that cyanuric chloride reacts with amines in three steps. One chlorine atom is replaced at 0° C., the second at 30°–50° C., and the third at 90°–100° C. (Fries, Ber. 19, 242, 2055 (1886)). Thus, one equivalent of a given alkoxyalkyl amine reacted with cyanuric chloride at 0° C. yields the corresponding 2,4-dichloro-6-(alkoxyalkylamino) triazine. Such compounds can be reacted further at 30–40° C. with another equivalent alkoxyalkylamine and then with an equivalent of a metal alkoxide or mercaptide at reflux temperature to yield the compounds of this invention as illustrated by Equation 2 above.

The compounds of this invention are solids or oils which are relatively insoluble in water. The compounds illustrated by Equation 2 above are generally oils or low melting solids and are soluble in kerosene, xylene, alcohol and benzene.

From a standpoint of herbicidal activity and ease and economy of preparation, among the best compounds of the present invention are those wherein Y is an alkoxy radical, and preferably methoxy and $n$ equals 3. These compounds give perhaps the quickest weed control of all the compounds represented by Formula 1, insofar as postemergence herbicidal activity is concerned.

Particularly preferred because of its excellent control of plants at low rates is: 2-methylmercapto-4,6-bis-(3-methoxypropylamine)-s-triazine.

In use these compounds can be applied to areas to be protected from undesirable vegetation in any of a variety of compositions. Thus any that are sufficiently water-soluble can be applied simply as water solutions.

It is preferred, however, that the compounds be extended with carrier materials or conditioning agents of the kind used and referred to in the art as herbicidal adjuvants or modifiers. Inert solids, surface-active agents, and organic liquids are examples of such adjuvants.

The compounds shown above will be included in any compositions in sufficient amount to exert a herbicidal effect, usually from about 0.5% to 95% by weight.

Power formulations can be prepared with inert solids. The formulations thus can be prepared with insert solids to form dusts. The powders usually comprise the active ingredient admixed with minor amounts of conditioning agent. Natural clays (either absorptive, such as attapulgite, or relatively nonabsorptive, such as china clays), diatomaceous earth, walnut shell flour, redwood flour, synthetic fine silica, calcium silicate, and other inert solid carriers of the kind conventionally employed in powder herbicidal compositions can be used. The active ingredient usually makes up from about 20–75% of these powder compositions. The solids ordinarily should be very finely divided and should have a particle size below about 50 microns and preferably below about 20 microns. Talc, pyrophyllite, tobacco dust, volcanic ash, and other dense rapid-settling insert solids customarily are used for conversion of the powders to dusts.

The active compound, either alone or with other conditioning agents, may be dissolved or dispersed in water and then sprayed, or in any other desired manner, applied to an absorptive powder or granule, which can then be dried to produce a dry product. It can also be mixed with sufficient water to form a paste which can be extruded in pellet form. Any of the above absorptive materials can be used for the preparation of such products.

Liquid compositions including the active compounds above described can be prepared by admixing the active compound with a suitable liquid diluent. The active compound can be either in solution or in suspension. Typical of the liquid media commonly employed are kerosene, Stoddard solvent, xylene, alcohols, alkylated naphthalene, diesel oil, glycols and ketones such as diisobutyl ketone, cyclohexanone, etc. The active ingredient usually makes up from about 0.5 to 50% of these liquid compositions. Some of these compositions are designed to be used as such, and other are to be extended with large quantities of water or with other organic solvents.

Compositions in the form of wettable powders or liquids can also include one or more surface-active agents such as wetting, dispersing, or emulsifying agents. Thus mixtures of the above liquids with the active compounds can contain an emulsifying agent to make an emulsifiable oil composition. The surface-active agents cause the compositions to disperse or emulsify easily in water to give aqueous sprays.

The surface-active agents employed can be of the anionic, cationic, or nonionic type. They include, for example, sodium oleate, sulfonated petroleum oils, alkyl aryl sulfonates, sodium lauryl sulfate, polyethylene oxides, and lignin sulfonates. A detailed list of such agents is set forth in an article by McCutcheon in "Soap and Chemical Specialties," volume 31, Nos. 7–10 (1955), and more recently in the booklet by John W. McCutcheon, Inc., "Detergents and Emulsifiers—Up to Date," 1960.

Generally, surfactants will be present in the range of 0.5 to 10% by weight. However, surfactants can be used with the compounds of this invention at much higher levels to increase the biological action of the active compounds. It is found that many surfactants, when used in an amount equal to that of the herbicide, or in even greater amounts up to 3 to 10 times the weight of herbicide produce a greatly enhanced activity, causing high herbicidal effectiveness at very low herbicide use rates. The most highly effective surfactants are the non-ionic per acre of the active ingredient. Under some conditions, rates as low as 20 pounds per acre will give satisfactory control of vegetation. Application at rates of about 0.5 to 5 pounds per acre of the active ingredient for pre-emergence or early directed post-emergence treatment gives excellent control of broadleaf weeds and grasses in in hardy crop plants such as corn, sorghum, sugar cane, and cotton.

In order that the invention can be better understood, the following examples are given in addition to those set forth above:

EXAMPLE 1

To a solution of 29.7 parts of sodium methoxide in 800 parts of methanol is added 145 parts of 2,4-bis(3-methoxypropylamino)-6-chloro-s-triazine. The mixture is refluxed for about five hours, allowed to cool and filtered from the sodium chloride. This filtrate is combined with 500 parts of water, stirred well, and finally extracted thoroughly with a total of 2000 parts by weight of methylene chloride. The methylene chloride solution, dried over $MgSO_4$, filtered and stripped solvent-free under reduced pressure, yields essentially pure product, namely 2,4 - bis(3 - methoxypropylamino) - 6 - methoxy - s - triazine, $n_D^{25} = 1.5228$.

EXAMPLES 2–8

The products listed in the following table are prepared in accordance with the procedure of Example 1 by replacing the chlorotriazine and alkoxide of Example 1 with the reagents listed in Table I.

Table I

| Example | Chlorotriazine | Parts used | Alkoxide | Parts used | Product obtained |
|---|---|---|---|---|---|
| 2 | 2-chloro-4,6-bis-(3-ethoxypropylamino)-s-triazine. | 125.5 | Sodium ethoxide | 74.8 | 2-ethoxy-4,6-bis-(3-ethoxypropylamino)-s-triazine. |
| 3 | 2-chloro-4,6-bis-(3-methoxypropylamino)-s-triazine. | 118.5 | Sodium methyl mercaptide. | 77 | 2-methylmercapto-4,6-bis-(3-methoxypropylamino)-s-triazine. |
| 4 | 2,4-bis(3-propoxypropylamino)-6-chloro-s-triazine. | 159 | Sodium ethoxide | 37.4 | 2,4-bis(3-propoxypropylamino)-6-ethoxy-s-triazine. |
| 5 | 2,4-bis(3-methoxypropylamino)-6-chloro-s-triazine. | 145 | Sodium ethyl mercaptide | 46.2 | 2,4-bis(3-methoxypropylamino)-6-ethyl-mercapto-s-triazine. |
| 6 | 2,4-bis(3-ethoxypropylamino)-6-chloro-s-triazine. | 152 | Sodium methoxide | 29.7 | 2,4-bis(3-ethoxypropylamino)-6-methoxy-s-triazine. |
| 7 | 2,4-bis[3-(1-octyl)-oxypropylamino]-6-chloro-s-triazine. | 243.5 | ___do___ | 29.7 | 2,4-bis[3-(1-octyl)oxypropylamino]-6-methoxy-s-triazine. |
| 8 | 2,4-bis(4-methoxybutylamino)-6-chloro-s-triazine. | 159 | ___do___ | 29.7 | 2,4-bis(4-methoxybutylamino)-6-methoxy-s-triazine. | members which are polyethylene oxide adducts of long chain alcohols or fatty acid glycerol, sorbitan or other polyglycol esters. A number of anionic sulfonates or sulfates are also active such as sodium dodecylbenzenesulfonate or sodium lauryl sulfate.

The compounds can be applied in compositions of the types shown in Jones U.S. Patent 2,412,510 in which an active compound of this invention replaces the active materials of that patent in the composition shown and in like amount. Similarly, any of the carriers, additives, or surface-active agents there named or referred to can be used.

The herbicidal method of the present invention comprises applying a substituted triazine of Formula 1, ordinarily in a herbicidal composition of the aforementioned type, to the locus or area to be protected from undesirable plant growth. The active compound is, of course, applied in sufficient amount to exert the desired herbicidal action. The application can be made directly upon the locus or area and the vegetation thereon during the period of infestation. Alternatively, the application can be made in advance of an anticipated weed infestation.

The dosage employed can be determined readily by those skilled in the art by conventional techniques. It is, of course, dependent upon the particular active ingredient employed, the nature of the formulation used, the type of treatment, the type of vegetation to be controlled, climatic conditions, and the like. In general, complete control of vegetation is obtained at rates of about 40 to 80 pounds The following compounds are also prepared in accordance with the procedure of Example 1 by utilizing the appropriate starting materials:

9. 2-ethoxy-4-(6-methoxyhexylamino)-6-(4-butoxybutylamino)-s-triazine
10. 2-methoxy-4,6-bis[5-(1-amyl)oxyamylamino]-s-triazine
11. 2-methylmercapto-4,6-bis(4-ethoxybutylamino)-s-triazine
12. 2-ethylmercapto-4-(4-ethoxybutylamino)-6-(3-methoxypropylamino)-s-triazine
13. 2,4-bis(3-methoxypropylamino)-6-ethoxy-s-triazine
14. 2,4-bis(3-isopropoxypropylamino)-6-methoxy-s-triazine
15. 2,4-bis(3-butoxypropylamino)-6-methoxy-s-triazine
16. 2,4-bis(3-ethoxypropylamino)-6-ethoxy-s-triazine
17. 2,4-bis(3-methoxypropylamino)-6-ethoxy-s-triazine
18. 2-methylmercapto-4,6-bis(3-methoxypropylamino)-s-triazine
19. 2-methylmercapto-4-(3-ethoxypropylamino)-6-(3-methoxypropylamino)-s-triazine
20. 2-methoxy-4-(3-methoxypropylamino)-6-(3-methoxyamylamino)-s-triazine
21. 2,4-bis(8-methoxyoctylamino)-6-methoxy-s-triazine
22. 2,4-bis(methoxyisopropylamino)-6-methoxy-s-triazine
23. 2,4-bis(methoxyisopropylamino)-6-methylmercapto-s-triazine
24. 2,4-bis(methoxyisopropylamino)-6-ethoxy-s-triazine

EXAMPLE 25

A wettable powder of the following composition is prepared:

| | Percent |
|---|---|
| 2,4 - bis - (3 - methoxypropylamino) - 6 - methoxy-s-triazine | 50 |
| Polyethylene oxide esters of mixed resin and fatty acids concreted with urea | 3 |
| Low viscosity methyl cellulose | 0.5 |
| Disodium phosphate | 1.5 |
| High surface area calcium silicate | 45 |

The ingredients are blended and are passed once through a micropulverizer using no retaining screen. After this initial grinding-mixing step, the product is ground through the same micropulverizer using an 0.020 inch round hole screen. Care is taken that the mill does not heat up too much during the grinding step. If desired, cooling agents such as Dry Ice may be ground along with the product. After grinding the product has a particle size of less than 50 microns.

The resulting composition, when applied at a rate of 40 pounds per acre of active ingredient in 200 gallons of water, gives rapid kill of foliage of ragweed, rough pigweed, yellow foxtail, mustard, and crab grass. Outstanding weed control is noted for an extended period of time.

Another portion of this formulation is applied at a rate of 4 pounds of active ingredient per acre in 80 gallons of water as a pre-emergence treatment to fields planted to corn and sugar cane. Excellent control of annual broadleaf and grass weeds is obtained.

EXAMPLE 26

An emulsifiable oil composition is prepared as follows:

| | Percent |
|---|---|
| 2,4 - bis - (3 - methoxypropylamino) - 6 - ethylmercapto-s-triazine | 40 |
| Blend of poly-alcohol carboxylic esters and oil-soluble sulfonates | 8 |
| Xylene | 52 |

The ingredients are blended by simple stirring; the materials are heated gently to approximately 50–60° C. in order to facilitate the mixing.

The product is an emulsifiable oil that can be extended with water to form emulsions that are suitable for spraying. Alternatively, the oil concentrate can be extended with other organic solvents, such as diesel oil.

This product, when applied at a rate of 80 pounds of active ingredient per acre after extension with water to make a total application of 250 gallons of solution per acre, gives excellent control of a mixed infestation of grass and broadleaf weeds along fence rows. An application of 25 pounds (active) per acre gives control of annual weeds growing around signposts.

EXAMPLE 27

A dust composition is prepared as follows:

| | Percent |
|---|---|
| 2-ethoxy-4,6-bis(3-ethoxypropylamino)-s-triazine | 10 |
| High surface area fine silica | 20 |
| Walnut shell flour | 70 |

The triazine is blended with the fine silica and passed twice through a micropulverizer in order to mix the triazine with the silica and reduce its particle size. After grinding the mixture is incorporated into the walnut shell flour to yield a dust suited for dust application of the herbicide in conventional equipment.

This composition is applied with a hand duster at the rate of 800 pounds per acre to weed infested areas around the base of telephone poles. Excellent control of crab grass, yellow foxtail, jimson weed, poke weed, and ragweed is noted.

EXAMPLE 28

The following oil composition is prepared:

| | Percent |
|---|---|
| 2,4-bis-(3-methoxypropylamino)-6-ethoxy-s-triazine | 30 |
| Heavy aromatic naphtha | 70 |

The ingredients are mixed and stirred until homogeneous, this is facilitated by gentle heating to approximately 80° C.

The resulting product can be extended with aromatic oils or diesel oil; this product, however, cannot be diluted with water.

This composition is applied at the rate of 60 pounds per acre of active ingredient after extension with 200 gallons of diesel oil to a railroad right-of-way with a specially equipped railroad car. Rapid top-kill of foliage is noted on a mixed infestation of annual and perennial broadleaf and grass weeds. Good residual weed control is obtained in this area.

EXAMPLE 29

The triazines can also be prepared and applied in granular form as shown:

| | Percent |
|---|---|
| 2,4-bis(3-propoxypropylamino)-6-ethoxy-s-triazine | 2 |
| Granular attapulgite fuller's earth (15–30 mesh) | 98 |

Two pounds of 2,4-bis(3-propoxypropylamino)-6-ethoxy-s-triazine are heated until the crystals are molten, and are sprayed on 98 pounds of granular attapulgite fuller's earth (15–30 mesh) which is maintained at the same temperature inside a heated drum blender. Agitation is continued until the active ingredient is homogeneously dispersed throughout the mass. The products are then allowed to cool.

This granular formulation is applied at the rate of 3,000 pounds per acre by means of a special type of fertilizer distributor. Excellent control of broadleaf and grass weeds growing along highway guard rails is obtained.

EXAMPLE 30

| | Percent |
|---|---|
| 2-methoxy-4,6-bis(3-methoxypropylamino)-s-triazine | 2 |
| Granular vermiculite | 98 |

The active is applied to the vermiculite in molten form as described in Example 29.

This formulation is applied with a tractor-drawn granular spreader at the rate of 2 pounds (active) per acre for the pre-emergence control of annual broadleaf and grass weeds in corn. Excellent weed control is obtained.

EXAMPLE 31

The following wettable powder is prepared:

| | Percent |
|---|---|
| 2,4-bis-(3-ethoxypropylamino)-6-methoxy-s-triazine | 50 |
| Oleyl ester of sodium isethionate | 1 |
| Sodium lignosulfonate | 1 |
| Disodium phosphate | 2 |
| Calcium silicate | 46 |

The ingredients are mixed and are passed three times through the micropulverizer with an 0.020 herringbone screen.

The product is a finely divided powder with the majority of particles smaller than 50 microns.

This composition, when applied at the rate of 70 pounds per acre of active ingredient in 300 gallons of water, gives excellent control of annual and perennial weeds growing in warehouse storage areas.

EXAMPLE 32

The following dust composition is prepared:

| | Percent |
|---|---|
| 2,4-bis-(3-methoxypropylamino)-6-methoxy-s-triazine | 10 |
| Sodium salt of alkylated naphthalene sulfonic acid | 1 |
| Lauryl alcohol | 0.5 |
| Micaceous talc | 88.5 |

The triazine is blended with four times its weight of talc and is ground and deagglomerated in the micropulverizer. If necessary, cooling agents such as Dry Ice may be used to keep the grinding temperature inside the micropulverizer sufficiently low to avoid caking.

This ground product is blended with the other ingredients and remaining talc to make a dust composition suitable for use as herbicidal dust.

This dust composition is applied at the rate of 600 pounds per acre with a specially adapted duster to a mowed grass stubble in a warehouse area. Good control of such undesirable grasses as quack grass, crab grass, foxtail, cheat and barnyard grass is obtained.

EXAMPLE 33

In order to form a granular formulation of the triazine, the following wettable powder is first prepared:

| | Percent |
|---|---|
| 2,4-bis(4-butoxybutylamino)-6-methylmercapto-s-triazine | 50 |
| Sodium dioctyl sulfosuccinate (85%) concreted with sodium benzoate (15%) | 1 |
| Sodium lignosulfonate | 4 |
| High surface area fine silica | 45 |

The ingredients are carefully blended and ground by air reductionizing. Two pounds of the wettable powder above is mixed with approximately 97 pounds of granular attapulgite fuller's earth (15–30 mesh) in a ribbon blender. When the blend is homogeneous, two pounds of a 50:50 weight mixture of water and ethylene glycol are sprayed in while the blender ribbons are agitating the mixture. Blending and drying of the paste produces a granular product which contains approximately 1% of the triazine herbicide.

This 1% formulation, when applied at the rate of 60 pounds per acre of the active ingredient, gives excellent control of undesirable vegetation around highway signs, boundary fences, and safety fences.

EXAMPLE 34

A wettable powder of the following composition is prepared:

| | Percent |
|---|---|
| 2,4-bis-(3-butoxypropylamino)-6-methoxy-s-triazine | 50 |
| Polyethylene oxide esters of mixed resin and fatty acids concreted with urea | 3 |
| Low viscosity methyl cellulose | 0.5 |
| Disodium phosphate | 1.5 |
| High surface area calcium silicate | 45 |

The ingredients are blended and are passed once through a micropulverizer using no retaining screen. After this initial grinding-mixing step, the product is ground through the same micropulverizer using an 0.020 inch round hole screen. Care is taken that the mill does not heat up too much during the grinding step; if desired, cooling agents such as Dry Ice may be ground along with the product. The product after grinding has a particle size of less than 50 microns.

The resulting powder can be used by adding it to water in order to form spray suspensions that can be used in conventional spray equipment. When applied at the rate of 80 pounds per acre of active ingredient in 300 gallons of water, excellent control is obtained of a wide variety of annual weeds growing on a tennis court.

EXAMPLE 35

The following oil composition is prepared:

| | Percent |
|---|---|
| 2-methylmercapto-4,6-bis-(3-methoxypropylamino)-s-triazine | 50 |
| alkylated naphthalenes, largely alpha-methyl naphthalene | 42 |
| Polyethylene oxide esters of mixed resin and fatty acids | 8 |

The ingredients are mixed and stirred together at a slightly elevated temperature to make an oil composition which, upon addition to water, forms an emulsion for use as a herbicidal spray. Or, if desired, the 50% oil composition above can be extended with organic solvents such as straight chain hydrocarbons, aromatic oils and diesel oil.

This formulation is applied at the rate of 50 pounds per acre of active ingredient in 150 gallons of diesel oil with a hand-operated pressure spray. This treatment gives excellent control of a mixed population of grass and broadleaf weeds under a cyclone boundary fence. Weed species, such as crabgrass, barnyard grass and pigweed are controlled with 20 pounds (active) in 80 gallons of diesel oil.

EXAMPLES 36 AND 37

2,4-bis(methoxyisopropylamino)-6-methoxy-s-triazine is substituted for the active ingredient in Examples 25 and 31 in like amount by weight. The substituted active ingredient is formulated in like manner. The new composition gives like results when used in the same manner as the composition of Examples 25 and 31.

EXAMPLE 38

2,4-bis(methoxyisopropylamino)-6-methylmercapto-s-triazine is substituted for the active ingredient in Example 26 in like amount by weight. The substituted active ingredient is formulated in like manner. The new composition gives like results when used in the same manner as the composition of Example 26.

EXAMPLE 39

| | Percent |
|---|---|
| 2-methylmercapto-4,6-bis(3-methoxypropylamino)-s-triazine | 25.0 |
| Alkyl naphthalene sulfonic acid, Na salt | 1.0 |
| Partially desulfonated sodium lignin sulfonate | 1.0 |
| Attapulgite clay | 73.0 |

The above composition is blended and micropulverized until substantially all particles are below 50 microns.

One pound (active) of the above product is mixed with two pounds of trimethylnonylpolyethylene glycol ether (6 mols ethylene oxide) in 35 gallons of water.

This tank mixture has utility for directed postemergence weed control in sugar cane, sweet corn and field corn. Thirty-five gallons of this spray mixture is applied to a vigorous growth of annual weeds about 1½ to 4 inches high, present in corn which has reached a height of 11 to 16 inches. The spray is directed on the weeds and at the base of the corn plant. Good control of crabgrass, foxtail, barnyard grass, pigweed, lamb's-quarters, and velvet leaf is obtained. The corn shows excellent growth.

I claim:

1. A herbicidal composition containing 0.5 to 10% by weight of a surface-active agent, 25 to 80% by weight of a pulverized solid diluent and 20 to 75% by weight of a compound represented by the formula:

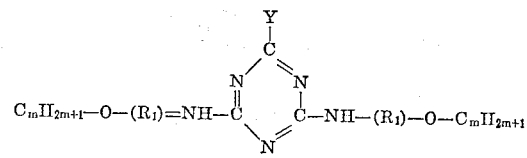

wherein $R_1$ is selected from the group consisting of

[—CH$_2$—(CH$_2$)$_{n-1}$—] and [—CH—(CH$_2$)$_{n-2}$—]
                                    |
                                   CH$_3$ $n$ is a whole positive integer from 3 through 8;
$m$ is a whole positive integer from 1 through 8; and
Y is a member of the group consisting of OR and SR where R is an alkyl group of less than 3 carbon atoms.

2. A composition according to claim 1, the composition additionally containing 1 to 5 parts by weight of a surface-active agent for each part of active compound of claim 1.

3. The method for the control of weeds comprising applying to the locus to be treated, in a herbicidally effective amount, a compound represented by the formula:

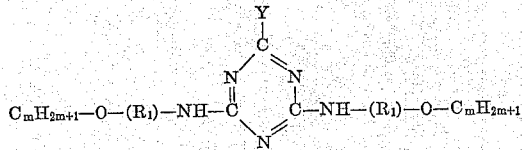

wherein $R_1$ is selected from the group consisting of

[—CH$_2$—(CH$_2$)$_{n-1}$—] and [—CH—(CH$_2$)$_{n-2}$—]
                                    |
                                   CH$_3$ $n$ is a whole positive integer from 3 through 8;
$m$ is a whole positive integer from 1 through 8; and
Y is a member of the group consisting of OR and SR where R is an alkyl group of less than 3 carbon atoms.

References Cited by the Examiner

UNITED STATES PATENTS

| | | | |
|---|---|---|---|
| 2,237,584 | 4/41 | Bruson | 260—249.8 |
| 2,368,451 | 1/45 | D'Alelio | 260—249.6 X |
| 2,497,917 | 2/50 | Stauffer | 260—249.8 |
| 2,780,623 | 2/57 | Welcher et al. | 260—249.8 |
| 2,820,033 | 1/58 | Kaiser et al. | 260—249.8 |
| 2,891,855 | 6/59 | Gysin et al. | 71—2.5 |
| 2,909,420 | 10/59 | Gysin et al. | 71—2.5 |
| 2,909,421 | 10/59 | Gysin et al. | 71—2.5 |
| 3,022,150 | 2/62 | Weed | 71—2.5 |
| 3,037,853 | 6/62 | Luckenbaugh | 71—2.5 |
| 3,152,882 | 10/64 | Luckenbaugh | 71—2.6 X |

FOREIGN PATENTS

| | | |
|---|---|---|
| 456,843 | 5/49 | Canada. |
| 880,433 | 12/42 | France. |
| 1,239,783 | 7/60 | France. |
| 222,719 | 11/49 | Switzerland. |

OTHER REFERENCES

Koopman: "Nieuwe Herbicide 1,3,5-Triazine Derivaten," May 31, 1957, pages 58 to 62.

LEWIS GOTTS, *Primary Examiner*.

IRVING MARCUS, M. A. BRINDISI, *Examiners*.

UNITED STATES PATENT OFFICE
CERTIFICATE OF CORRECTION

Patent No. 3,185,561                          May 25, 1965

Donald S. Acker

It is hereby certified that error appears in the above numbered patent requiring correction and that the said Letters Patent should read as corrected below.

Column 2, line 39, for "Power" read -- Powder --; lines 40 and 54, for "insert", each occurrence, read -- inert --; column 3, line 3, for "other" read -- others --; column 4, line 7, strike out "in"; column 6, lines 7 and 8, for "homogeneous," read -- homogeneous; --; column 8, lines 70 to 75, for that portion of the formula reading $$-(R_1)=NH-\quad\quad\text{read}\quad\quad -(R_1)-NH-$$

column 10, line 8, for "D'Alelio--------260-249.6 X" read -- D'Alelio-------260-249.6 XR --.

Signed and sealed this 12th day of October 1965.

(SEAL)
Attest:

ERNEST W. SWIDER                      EDWARD J. BRENNER
Attesting Officer                      Commissioner of Patents